US010146562B2

United States Patent
Korkus et al.

(10) Patent No.: US 10,146,562 B2
(45) Date of Patent: Dec. 4, 2018

(54) UNLIMITED ICON OVERLAYS

(71) Applicant: VARONIS SYSTEMS, LTD., Herzliya (IL)

(72) Inventors: Ohad Korkus, New York, NY (US); Saar Benodiz, Haifa (IL)

(73) Assignee: VARONIS SYSTEMS, LTD., Herzliya (IL)

(*) Notice: Subject to any disclaimer, the term of this patent is extended or adjusted under 35 U.S.C. 154(b) by 242 days.

(21) Appl. No.: 14/501,057

(22) Filed: Sep. 30, 2014

(65) Prior Publication Data
US 2016/0092083 A1 Mar. 31, 2016

(51) Int. Cl.
| G06F 3/048 | (2013.01) |
| G06F 9/451 | (2018.01) |
| H04N 21/431 | (2011.01) |
| G06F 3/0481 | (2013.01) |
| H04N 1/00 | (2006.01) |
| G06F 9/44 | (2018.01) |

(52) U.S. Cl.
CPC .......... *G06F 9/451* (2018.02); *G06F 3/04817* (2013.01); *G06F 9/4443* (2013.01); *H04N 1/00424* (2013.01); *H04N 21/4312* (2013.01)

(58) Field of Classification Search
CPC . G06F 3/0481; G06F 3/04817; G06F 3/04845
See application file for complete search history.

(56) References Cited

U.S. PATENT DOCUMENTS

| 6,031,532 A * | 2/2000 | Gourdol | G06F 3/04817 345/629 |
| 7,573,487 B1 * | 8/2009 | Petersen | G06F 3/04817 345/592 |
| 2004/0119756 A1 * | 6/2004 | Kumhyr | G06F 9/451 715/837 |
| 2004/0119757 A1 * | 6/2004 | Corley | G06F 3/04817 715/837 |
| 2004/0194021 A1 * | 9/2004 | Marshall | G06F 17/241 715/232 |
| 2006/0020899 A1 * | 1/2006 | Gusmorino | G06F 3/04817 715/765 |
| 2009/0070404 A1 * | 3/2009 | Mazzaferri | G06F 9/542 709/202 |
| 2011/0320477 A1 * | 12/2011 | Nestler | G06F 9/451 707/769 |
| 2012/0297342 A1 * | 11/2012 | Jang | G06F 3/04817 715/823 |
| 2013/0346898 A1 * | 12/2013 | Kokemohr | G06F 3/0482 715/769 |

* cited by examiner

*Primary Examiner* — Kevin L Young
*Assistant Examiner* — Linda Huynh
(74) *Attorney, Agent, or Firm* — Soroker Agmon Nordman

(57) ABSTRACT

A computerized method for modifying an icon image, comprising retrieving an original icon image of an operating system, combining the original icon image with sub-images thus forming a combined icon image, and replacing the original icon image with the combined icon image, wherein the method is performed on an at least one computerized apparatus configured to perform the method.

15 Claims, 2 Drawing Sheets

UNLIMITED ICON OVERLAYS

BACKGROUND

The present disclosure generally relates to graphical user interface, and more specifically to icons thereof.

Contemporary a graphical user interface (GUI) commonly uses icons, as images generally smaller than the presentation screen, by which entities such as applications and files are represented and accessed.

Icons overlays as images or symbols combined with icons for conveying information regarding the corresponding entities are known in GUIs. For example, a shortcut symbol in Windows (Microsoft Inc.) or number of pending calls or messages in Android (Google Inc.).

Generally, in order to add overlays that are not supported and/or limited by the underlying system of a GUI, programs such as scripts and/or programmatic 'tricks' are used. For example, as in stackoverflow.com/questions/72911/whats-the-best-way-to-organize-css-rules, taitems.github.io/iOS-Overlay/SUMMARY, or msdn.microsoft.com/en-us/library/windows.

SUMMARY

One exemplary embodiment of the disclosed subject matter is a computerized method for modifying an icon image, comprising retrieving an original icon image of an operating system, combining the original icon image with sub-images thus forming a combined icon image, and replacing the original icon image with the combined icon image, wherein the method is performed on an at least one computerized apparatus configured to perform the method.

Another exemplary embodiment of the disclosed subject matter is an apparatus configured to carry out the method.

BRIEF DESCRIPTION OF THE DRAWINGS

Some non-limiting exemplary embodiments or features of the disclosed subject matter are illustrated in the following drawings.

References to previously presented elements are implied without necessarily further citing the drawing or description in which they appear.

DETAILED DESCRIPTION

In the context of the present disclosure, without limiting, referring to an operating system implies a system underlying the GUI such as the Object Manager or Executive Services of Windows or the Kernel or Service Layer of Unix by which and/or via which overlays may be presented on an icon, or any infrastructure operative to that effect such as mobile platforms or open-OS.

In the context of some embodiments of the present disclosure, without limiting, the term 'practically' implies a realistic capability and an implementable capability rather than a purely theoretical capability, possibly within inherent rather than extrinsic constraints.

For brevity and clarity and without limiting, in the present disclosure referring to an overlay implies an overlay of an icon such as an image or a symbol combined and/or incorporated with the image of the icon.

For brevity and clarity and without limiting, in the present disclosure referring to an icon implies also an image of an icon.

In the context, of the present disclosure, without limiting, referring to a sub-image implies an image having a size related to a corresponding size and/or boundaries of image, such as smaller than the corresponding image. For example, a sub-image that is not larger than the boundaries of an image of an icon, while taking into account possible transparent regions of the icon to avoid hiding of the sub-image.

For brevity and clarity and without limiting, in the present disclosure referring to a symbol implies also a sub-image.

The terms cited above denote also inflections and conjugates thereof.

One technical problem dealt by the disclosed subject matter is presenting practically unlimited number of overlays on an icon in a GUI, independently of and/or by circumventing an underlying support of an operating system with respect to overlays presentation.

One technical solution according to the disclosed subject matter is replacing the image of an icon with the image of the icon that further includes one or more sub-images as suitably deemed fit, thus effectively presenting the icon with overlays independently of an underlying support of an operating system with respect to overlays presentation.

A potential technical effect of the disclosed subject matter is a GUI display device that presents icons with multiple overlay sub-images, thus mimicking or imitating practically unlimited overlays.

A general non-limiting overview of practicing the present disclosure is presented below. The overview outlines exemplary practice of embodiments of the present disclosure, providing a constructive basis for variant and/or alternative and/or divergent embodiments.

Figure 1:
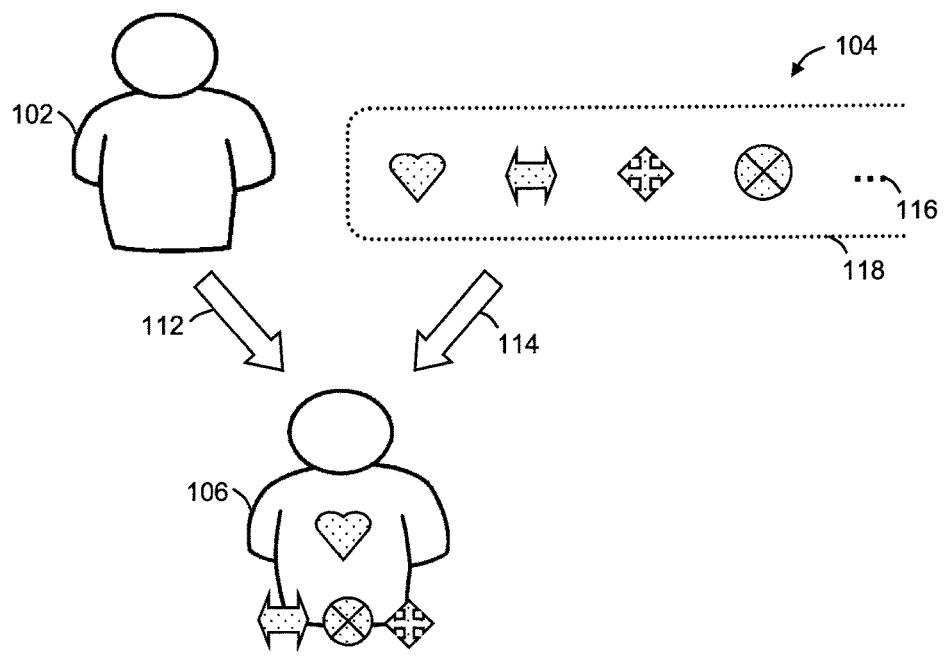
FIG. 1 schematically illustrates an icon image and a collection of symbols which are incorporated into the icon image with the symbols as overlays, according to exemplary embodiments of the disclosed subject matter.

FIG. 1 schematically illustrates an icon image 102 and a collection 104 of symbols which are incorporated into the icon image, as illustrated by an arrow 112 and an arrow 114, to form an icon image 106 with the symbols as overlays, according to exemplary embodiments of the disclosed subject matter.

The four symbols illustrated in collection 104 within a dotted open-ended frame denoted as 118 are provided by way of example and represent any number of any symbol or symbols as further illustrated by the triple-dots denoted as 116. The symbols are generally arbitrary without restriction, only possibly restricted by size to suitably fit with icon image 102. The number of the symbols does not preclude one symbol.

In some embodiments, some or all of the symbols are obtained from an operating system such as sub-images or images maintained in and/or by the operating system.

Generally and without limiting, icon image 102 as an original icon image is retrieved from icons of and/or associated with entities such as applications and files, so that icon image 102 and the symbols in collection 104 are independent of each other and of an underlying support of an operating system with respect to overlays presentation. It is also noted that the sizes and locations of the symbols with respect to icon image 102 are not restricted, possibly only by the boundaries of icon image 102.

Accordingly, icon image 102 is modified with symbols as overlays to generate icon image 106 with the symbols, and icon image 106 may replace the original icon, consequently providing an icon with practically unlimited overlays.

In some embodiments, a symbol is of a size as and/or similar to the size of icon image 102, where a portion and/or portions of the symbol are transparent and/or effectively transparent as known in the art, such as having a 'transparent color'.

Thus, restrictions and/or programming based on operating system with respect to presentation of overlays are circumvented or by-passed.

In some embodiments, icon image 102 is modified to generate icon image 106 with symbols as overlays according to a pre-set and/or determined plan and/or scheme and/or order, collectively referred to also as a scheme.

In some embodiments, the scheme involves priorities assigned to the symbols for rendering the symbols over icon image 102 based on the priorities.

For example, a first symbol having higher priority with respect to a second symbol would be rendered over and/or at least partially over the second symbol. As another example, a first symbol having higher priority with respect to a second symbol would be rendered over icon image 102 in a more prominent position than the second symbol, such as the center of icon image 102. As yet another example, a first symbol having higher priority with respect to a second symbol would be rendered over icon image 102 as a larger sub-image than the second symbol.

In some embodiments, the priorities are pre-set; optionally or alternatively, the priorities are determined, such as according to the source and/or sources or according to the type or transparency region of a symbol and/or symbols; optionally or alternatively, the priorities are based or likelihood of updating and/or replacing a symbol such as determined on recent history of updating and/or replacing the symbol; optionally or additionally, some of the priorities are pre-set and some are determined.

In some embodiments, the scheme involves at least one layout according to which the symbols are combined with icon image 102, wherein, at least optionally, the at least one layout involves and/or comprises order of rendering the symbols, thus determining positions of the sub-images with respect to icon image 102.

In some embodiments, a plurality of schemes may be used. For example, one scheme relates to or involves symbols with transparent regions and another scheme involves or relates to non-transparent symbols.

It is noted that, at least in some embodiments, no scheme is used, such that the symbols are combined with icon image 102 arbitrarily, possibly while keeping all the symbols visible at least partially.

By way of a non-limiting example, overlays limitations of Window and an approach for by-passing the limitations according to the present disclosure are demonstrated below.

According to Microsoft, the number of different icon overlay handlers that the system can support is limited by the amount of space available for icon overlays in the system image list. There are currently fifteen slots allotted for icon overlays, some of which are reserved by the system.

Generally, 3-4 overlay icons are reserved by the system, so that there are 11-12 available overlay icon slots in Windows® which can be used by programs such as third party applications. If this number is exceeded, overlays that were most recently applied are not shown. Moreover, the order of the overlays is determined by the names thereof in according to increasing alphanumeric order. A brief discussion of the limitations of Windows provided, for example, in stackoverflow.com/questions/1057734/tortoisesvn-icons-not-showing-up-under-windows-7

An exemplary by-pass solution is as follows. Registering into the Windows® registry a DLL, with an implementation of the interface lExtracticon, the latter is further exemplified in msdn.microsoftcom/en-us/library/windows/desktop/bb761852(v=vs.85).aspx The implementation of the interface allows changing the icon of each file in Windows Explorer®.

For example, the function lExtracticon GeticonLocation gets a file path, and expected to return the location of the associated icon. Basically the function returns the full path for the original icon file, on Which the operating system may add an overlay icon. Overriding the function with the following implementation: If a given file extension does not require any overlay icon, returning with the original associated icon. Deciding which overlay icon is required for a given file by the extension thereof. If a composite icon for the extension with overlay icon was already generated and stored on disk—returning with the full path to the icon. Getting the original icon associated with a specific extension, generally for all sizes of the icon.

For example, using Windows API®, GetImage in Windows Vista® and upper, or SHGetFileInfo, to retrieve the relevant images of the icon in all possible sizes. This operation may be omitted in case the images are already cached in memory. GetImage and SHGetFileInfo are further exemplified, respectively, in msdn.microsoft.com/en-us/library/windows/desktop/bb761082(v=vs.85).aspx and msdn.microsoft.com/en-us/library/windows/desktop/bb762179 (v=vs.85)aspx. Converting the images to BMP format, and caching in memory. Reading overlay icons, that is, overlay symbols, in BMP formats for all possible sizes. Combining in each size the icon and the corresponding overlay icon thus generating icons with overlay symbols. Saving e combined images to one icon file, and returning the location thereof.

It is noted that in the course of the operation of the system icons might be changed, therefore the cache of the generated icons should be maintained such as recurrently deleting and updating the icons.

Thus, an approach for full control for drawing 'overlay icons' anywhere on the original icon and in any size is provided.

Figure 2:
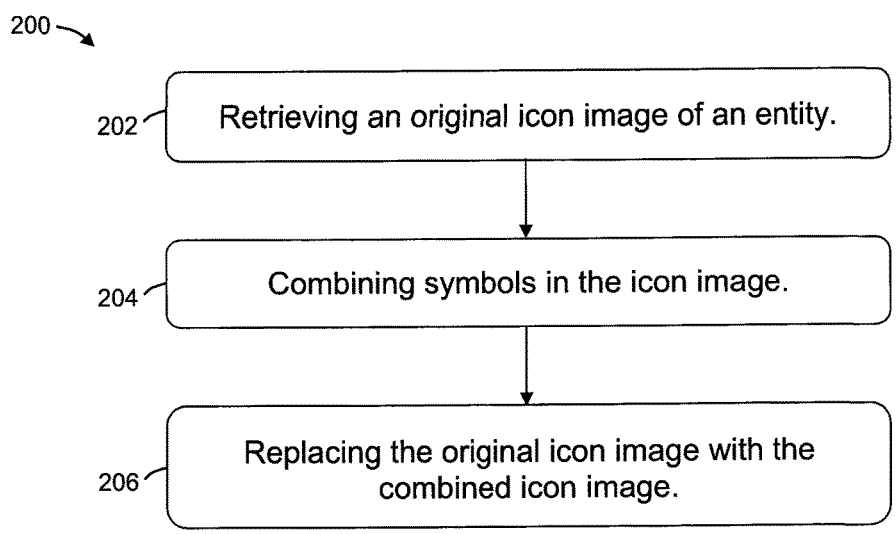
FIG. 2 outlines operations for providing an icon with overlays, according to exemplary embodiments of the disclosed subject matter.

FIG. 2 outlines operations 200 for providing an icon with overlays, according to exemplary embodiments of the disclosed subject matter.

In operation 202 an original icon image of an entity, such as of a file, is retrieved obtained and/or accessed and/or obtained, collectively referred to also as retrieved. For example, icon image 102 as an original icon image retrieved from and/or accessed in storage of an operating system.

The original icon is generally obtained from the operating system and/or data structures thereof such as an image repository by using functionalities of the operation system. For example, using APIs in case of Windows or Android.

In operation 204 symbols representative and/or imitating and/or modeling overlays are combined in and/or with the icon image, thereby forming a combined icon image. For example, symbols in collection 104 are combined with icon image 102 to form or generate icon image 106.

In some embodiments, at least some of the symbols as sub-images or images thereof are retrieved from the operating system.

In some embodiments, the symbols are combined with the icon image according to a pre-set and/or determined scheme. For example, the symbols are configured with and/or assigned relative priorities therebetween. Thus, the combination of the symbols with the icon image reflects the priorities, such as by relative sizes and/or positions, for example, a symbol with higher priority relative to another one would be larger and/or more prominent in comparison to the another object. At any rate, all the combined symbols would be visible over the icon image. As another example, the symbols are combined with the icon image according to a pre-set and/or determined layout.

Referring to the symbols above implies one symbol and/or any practical number of symbols.

In operation 206 the original icon image is replaced with the combined icon image, thus providing an icon image with arbitrary overlays and symbols thereof. Generally, the location of the original icon is used to override the original icon with the combined icon such as by using functionalities of the operating system.

It is noted that the combined icon image is applicable to the corresponding entity as the original icon image. For example, in case triggering the original icon image such as by double-click with a mouse or a finger would result in opening an associated document thus triggering the combined icon image would open the associated document.

It is emphasized that operations 200 are carried out on an at least one processing apparatus such as a computer, configured to perform operations 200, and that the combined icons with the symbols as overlays are displayable on a display device.

There is thus provided according to the present disclosure a computerized method for modifying an icon image, comprising retrieving an original icon image of an operating system, combining the original icon image with sub-images thus forming a combined icon image, and replacing the original icon image with the combined icon image, wherein the method is performed on an at least one computerized apparatus configured to perform the method.

In some embodiments, the sub-images are combined with the original icon image as overlays thereon.

In some embodiments, combining the original icon image with sub-images is according to a preset scheme.

In some embodiments, combining the original icon image with sub-images is according to a determined scheme.

In some embodiments, combining the original icon image with sub-images is according to a scheme of priorities of the sub-images.

In some embodiments, the scheme of priorities of the sub-images is in terms of sizes of the sub-images.

In some embodiments, the scheme of priorities of the sub-images is in terms of a layout of the sub-images.

In some embodiments, the scheme of priorities of the sub-images is in terms of an order of the sub-images.

In some embodiments, combining the original icon image with sub-images ensures the visibility of all the sub-images with the icon image.

In some embodiments, the number of the sub-images is practically unlimited.

In some embodiments, the sub-images are arbitrary.

In some embodiments, some of the sub-images are retrieved from the operating system.

In some embodiments, the combined icon image is applicable in the operating system as the original icon image.

In some embodiments, the sub-images comprise an at least one sub-image. There is thus further provided according to the present disclosure a computerized apparatus configured to carry out the method.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

The term 'configuring' and/or 'adapting' for an objective, or a variation thereof, implies using at least a software and/or electronic circuit and/or auxiliary apparatus designed and/or implemented and/or operable or operative to achieve the objective.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A computerized method for displaying a modified icon image, comprising:
   modifying an icon image with a processor performing (A) and (B):
   (A) retrieving a first original icon image of an operating system associated with applications and files;
   combining the first original icon image with sub-images as overlays thereon according to a scheme of priorities assigned to the sub-images reflected by relative sizes of the sub-images, such that a first sub-image having a higher priority with respect to a second sub-image is rendered over the first original icon image as a larger sub-image, so as to form a first combined icon image; and
   replacing the first original icon image with the first combined icon image;
   displaying the first combined icon image; and
   (B) registering a dynamic link library (DLL) in a Windows registry with an implementation of an IExtractIcon interface;
   upon assessing from the file extension that no overlay image for a second original icon image is required, executing an IExtractIon.GetIconLocation function associated with the IExtractIcon interface returning a file path with a file extension thereof of the second original icon image;
   upon assessing from the file extension that an overlay image for the second original icon image is required, overriding an IExtractIcon.GetIconLocation function associated with the IExtractIcon interface returning a file path with a file extension thereof of the second original icon image comprising:
      deciding which overlay image to apply to the second original icon image based on the file extension;
      fetching the second original icon image with a plurality of sizes associated with the file extension;
      converting the second original icon image to bitmap (BMP) format;
      reading the decided overlay image in BMP format with a respective plurality of sizes;
      combining the second original icon image for each of the plurality of sizes with the decided overlay image with the respective plurality of sizes into a second combined icon image; and
      saving the second combined icon image and returning a second file path to the second combined icon image; and
   displaying the second combined icon image.

2. The method according to claim 1, wherein combining the first original icon image with sub-images is according to a preset scheme.

3. The method according to claim 1, wherein combining the first original icon image with sub-images is according to a determined scheme.

4. The method according to claim 1, wherein the scheme of priorities of the sub-images is in terms of a layout of the sub-images.

5. The method according to claim 1, wherein the scheme of priorities of the sub-images is in terms of an order of the sub-images.

6. The method according to claim 1, wherein combining the first original icon image with sub-images ensures the visibility of all the sub-images with the first combined icon image.

7. The method according to claim 1, wherein the size of the sub-images is restricted by boundaries of the first original icon image.

8. The method according to claim 1, wherein some of the sub-images are retrieved from the operating system.

9. The method according to claim 1, wherein the first combine icon image is applicable in the operating system as the first original icon image.

10. The method according to claim 1, wherein the sub-images comprise an at least one sub-image.

11. The method according to claim 1, wherein at least some of the priorities are pre-set.

12. The method according to claim 1, wherein at least some of the priorities are determined according to type of a sub-image.

13. The method according to claim 1, wherein the scheme involve at least one layout according to which the sub-images are combined with the first icon image wherein the at least one layout involves order of rendering the sub-images, thus determining positions of the sub-images with respect to the first combined icon image.

14. The method according to claim 1, wherein sizes and locations of the sub-images with respect to the original image icon are restricted by boundaries of the first original icon image.

15. A computerized system configured to display a modified icon image, comprising:
   a processor configured to modify an icon image by performing (A) and (B):
   (A) retrieve a first original icon image of an operating system associated with applications and files;
   combine the first original icon image with sub-images as overlays thereon according to a scheme of priorities assigned to the sub-images reflected by relative sizes of the sub-images, such that a first sub-image having a higher priority with respect to a second sub-image is rendered over the first original icon image as a larger sub-image, so as to form a first combined icon image;
   replace the first original icon image with the first combined icon image;
   (B) register a dynamic link library (DILL) in a Windows registry with an implementation of an IExtractIcon interface;
   upon assessing from the file extension that no overlay image for a second original icon image is required, execute an IExtractIcon.GetIconLocation function associated with the IExtractIcon interface returning a file path with a file extension thereof of the second original icon image;
   upon assessing from the file extension that an overlay image for the second original icon image is required, override an IExtractIcon.GetIconLocation function associated with the IExtractIcon interface for returning a file path with a file extension thereof of the second original icon image comprising:
      deciding which overlay image to apply to the second original icon image based on the file extension;
      fetching the second original icon image with a plurality of sizes associated with the file extension;
      converting the second original icon image to bitmap (BMP) format;
      reading the decided overlay image in BMP format with a respective plurality of sizes;
      combining the second original icon image for each of the plurality of sizes with the decided overlay image with the respective plurality of sizes into a second combined icon image;
saving the second combined icon image and returning a second file path to the second combined icon image; and
a display device displaying the first combined icon image and the second combined icon image.

* * * * *